Jan. 23, 1962 L. C. YOUNG 3,017,675
MOLD CLOSER APPARATUS
Filed May 22, 1958 4 Sheets-Sheet 1

INVENTOR.
LESTER C. YOUNG
BY Woodley & Knost
Attys.

Jan. 23, 1962   L. C. YOUNG   3,017,675
MOLD CLOSER APPARATUS
Filed May 22, 1958   4 Sheets-Sheet 4

INVENTOR
LESTER C. YOUNG
BY
Woodling + Krost
Attys.

3,017,675
MOLD CLOSER APPARATUS
Lester C. Young, Cleveland, Ohio, assignor to
Spo, Inc., a corporation of Ohio
Filed May 22, 1958, Ser. No. 737,021
13 Claims. (Cl. 22—31)

The invention relates in general to apparatus for placing or putting two members together and more particularly to an apparatus for automatically placing a cope flask on a drag flask without the necessity of stopping or indexing the drag flask which is being transported, usually on a continuously moving mold conveyor.

In the usual present day automated production set ups, the cope and drag molds are closed by indexing and/or stopping the drag mold as it travels along a conveyor system and lowering the cope mold into closed position while the drag is stopped. With the advent of stepped up production requirements, and multiple closing stations the stopping or indexing of each drag mold for a closing operation has become too much of a time and space consuming proposition to be compatible with these requirements.

It is therefore an object of the present invention to provide an apparatus for placing cope molds in place on drag molds while the drag molds are continuously transported along a conveyor system.

Another object of the invention is to provide a mold closer apparatus with a means for moving the same along a mold conveyor which means includes both pneumatic and hydraulic systems for smoother moving of the apparatus.

Another object of the invention is to provide a mold closer apparatus movable along a mold conveyor with a means for synchronizing the travel of the apparatus and a first mold carried by the mold conveyor whereby a second mold carried by the apparatus may be placed on the first mold.

Another object of the invention is to provide a mold closer apparatus for laterally and longitudinally aligning a drag mold on a conveyor, with a cope mold carried by a cope transfer mechanism.

Other objects and a fuller understanding of this invention may be had by referring to the following description and claims, taken in conjunction with the accompanying drawings, in which:

FIGURE 5 is a fragmentary view taken generally along the line 5—5 of FIGURE 2.

Figure 1:
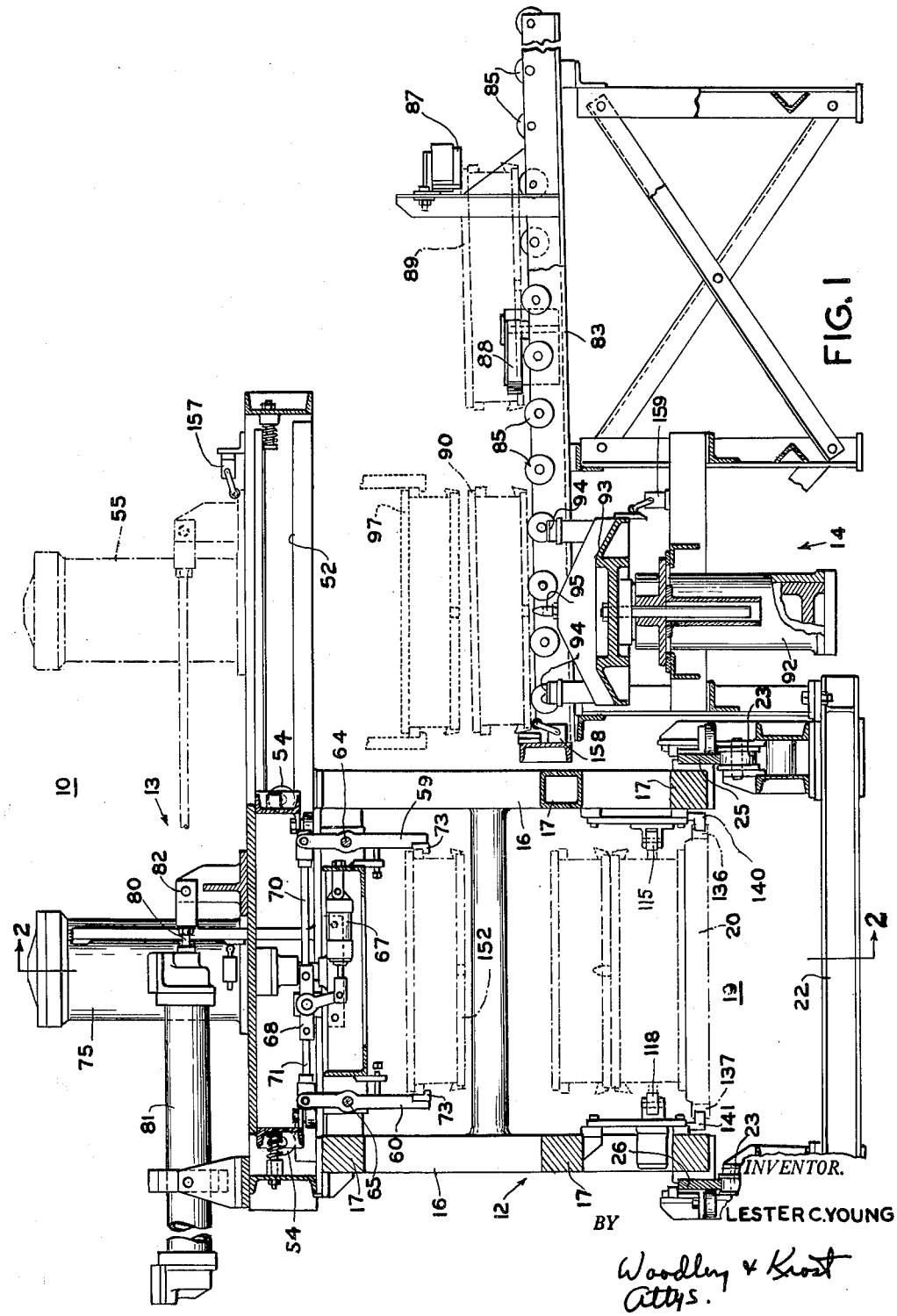
FIGURE 1 is a side elevational view partially in section of the apparatus of the present invention taken generally along the line 1—1 of FIGURE 2.

The apparatus of the present invention has been indicated generally by the reference numeral 10 and includes generally a framework 12, a cope carrying or transfer mechanism 13, and an elevator or receiving station 14. The framework 12 includes a plurality of vertically extending frame members 16 interconnected by a plurality of horizontally extending frame members 17. The framework 12 is located over a mold conveyor 19 which includes a plurality of pallets 20. A track assembly is provided for mounting the framework 12 so that the framework may travel between first and second positions along the mold conveyor and generally parallel thereto. The track construction includes a base 22 mounting a plurality of rollers 23 on either side of the mold conveyor on generally horizontal axes. Secured to the lower portion of either side of the framework 12 are first and second side rails 25 and 26, respectively. The first side rail 25 rests and travels on the rollers 23 on the right side of the mold conveyor, as viewed in FIGURE 1, and the second side rail 26 rolls on the track on the left side of the conveyor.

Means 30 (FIGURES 2, 3 and 5) are provided for moving the framework 12 through the above referred to movement between the first and second positions. This means includes a pneumatic cylinder 31 mounted on a fixed framework 32. Within cylinder 31 a piston is adapted to slidably travel in a direction which is determined upon which side of the piston air is introduced. Connected to the piston is a piston rod 33 which has an end thereof secured to the framework 12, as at 34. Immediately above the pneumatic cylinder 31 is mounted a hydraulic cylinder 36. The hydraulic cylinder has a piston 37 which is secured to the framework, as at 38. The purpose of the hydraulic cylinder will be more fully described hereinafter. It will be seen that a conduit 40 leads from the front end of the cylinder 36 to a hydraulic fluid reservoir 41 and a second conduit 42 leads from the back end of the hydraulic cylinder to the reservoir. A third conduit 43 separate from either of the conduits 40 or 42 leads directly from the front end of the hydraulic cylinder to the back end. A one-way check valve 45 is interposed in conduit 40 and in conduit 43 a throttle valve 47 and a remotely controlled open and closed valve 48 is located.

The cope transfer mechanism 13 is supported by the framework 12. The cope transfer mechanism includes generally an overhead track 52 which is fixedly secured to the framework 12 and extends generally at right angles thereto and accordingly at right angles to the mold conveyor 19. The cope transfer mechanism is provided with a plurality of rollers 54 which permit travel on the track 52 between the first and second position. The position in which the cope transfer mechanism 13 is shown in FIGURE 1 is the second position whereas the first position is indicated by the dot-dash lines 55 (FIGURE 1). First and second pairs of spaced fingers 59 and 60 form a part of the cope transfer mechanism and these pairs of fingers are pivotally mounted, as at 64 and 65, respectively. A pneumatic cylinder 67 actuates a pivotally mounted lever 68. A first link 70 is pivotally connected at one end to the lever 68 and is pivotally connected at the other end to the first pair of fingers 59. A second link 71 is pivotally connected at one end to the lever 68 and at the other end to the second pair of fingers 60. Actuation of the pneumatic cylinder 67, therefore, causes the fingers to pivot about their pivotal mountings thereby changing the relative positioning of the gripping portions 73 of the fingers. The cope transfer mechanism 13 also includes means for raising and lowering the gripping finger assembly and this means includes a vertically mounted pneumatic cylinder 75 within which a piston 76 is adapted to slide and to which is secured two piston rods 77. The reason for using more than one piston rod is to prevent the gripping finger assembly from turning relative to the cylinder 75. The lower extremities of the piston rods 77 are secured to the gripping finger assembly, as at 78. The means for moving the cope transfer mechanism from the full line position of FIGURE 1 to the dot-dash position 55 includes another pneumatic cylinder 81 fixedly secured to the framework 12 and having a piston (not shown) attached to a piston rod 80 which in turn is secured to the cope transfer mechanism, as at 82.

Referring to FIGURE 1, a gravity type conveyor 83 has been shown which approaches the mold conveyor 19 at generally right angles thereto. The conveyor 83 includes a plurality of rollers 85 and is for the purpose of transporting cope flasks to the elevator 14. It will be readily recognized that any suitable means might be utilized for transporting copes to the elevator and this is only one of the many physical embodiments that might be utilized. A scraper 87 is mounted above the conveyor 83 and is for the purpose of scraping excess sand from the top of the cope. A spring biased brake mechanism 88 is also provided and is for the purpose of holding a cope in the dot-dash line 89 position until a cope in the dot-dash line 90 position on the elevator has been removed therefrom and the elevator has returned to the position shown in the full line drawing of FIGURE 1. Means are provided for raising and lowering the elevator 14 and this means includes a vertically mounted pneumatic cylinder 92 within which a piston is adapted to reciprocate which piston has secured thereto a piston rod which extends from the cylinder and is in turn secured to a platform 93. This platform 93 includes lifting pads 94 and pre-alignment pins 95. The pins 95 are adapted to enter bushings which are provided on the cope flask to pre-align the cope, and the pads 94 are designed to engage the cope immediately after the pins to lift the cope to the dotted line position 97.

Figure 2:
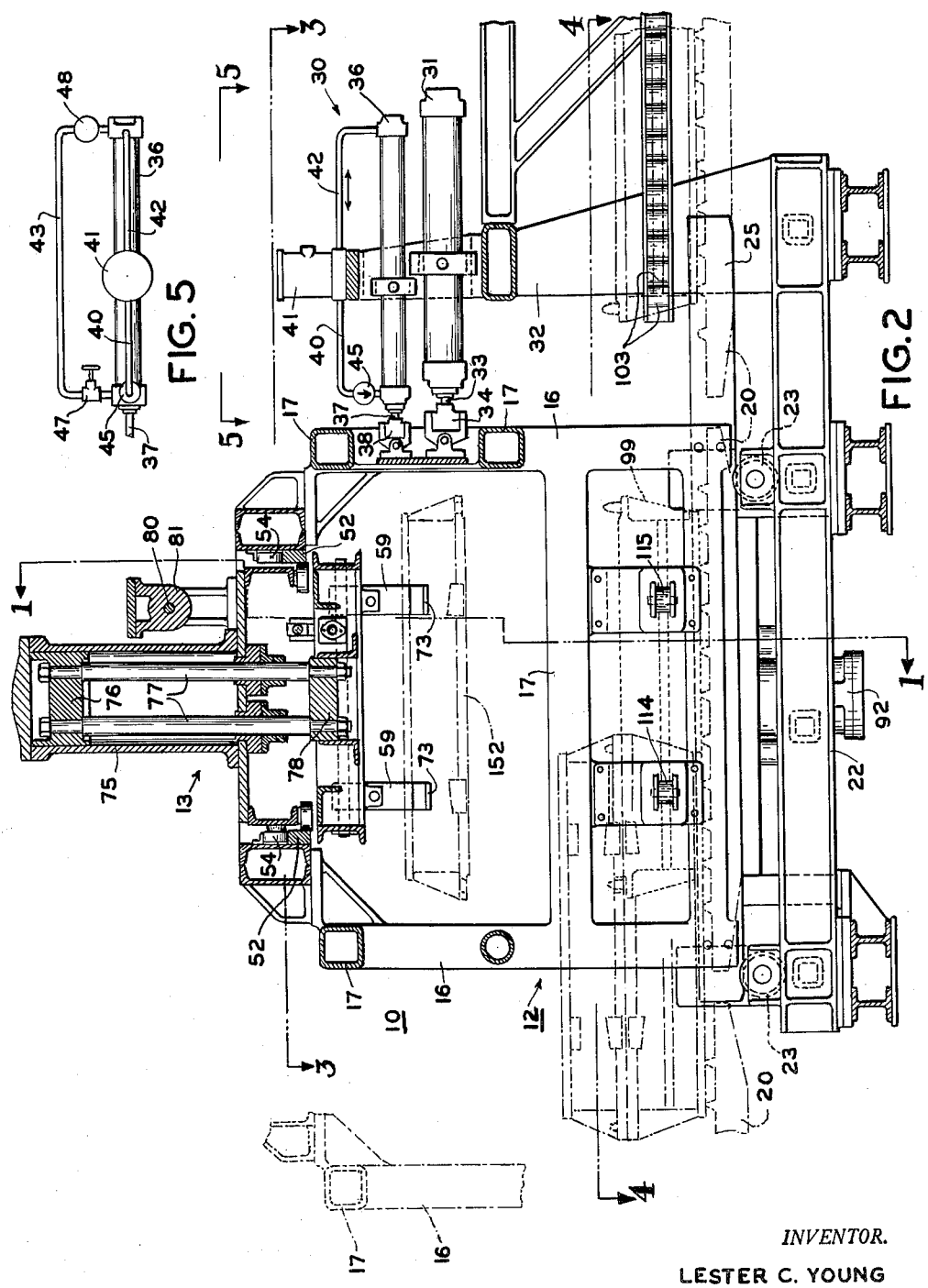
FIGURE 2 is an end elevational view partially in section taken generally along the line 2—2 of FIGURE 1.
Figure 3:
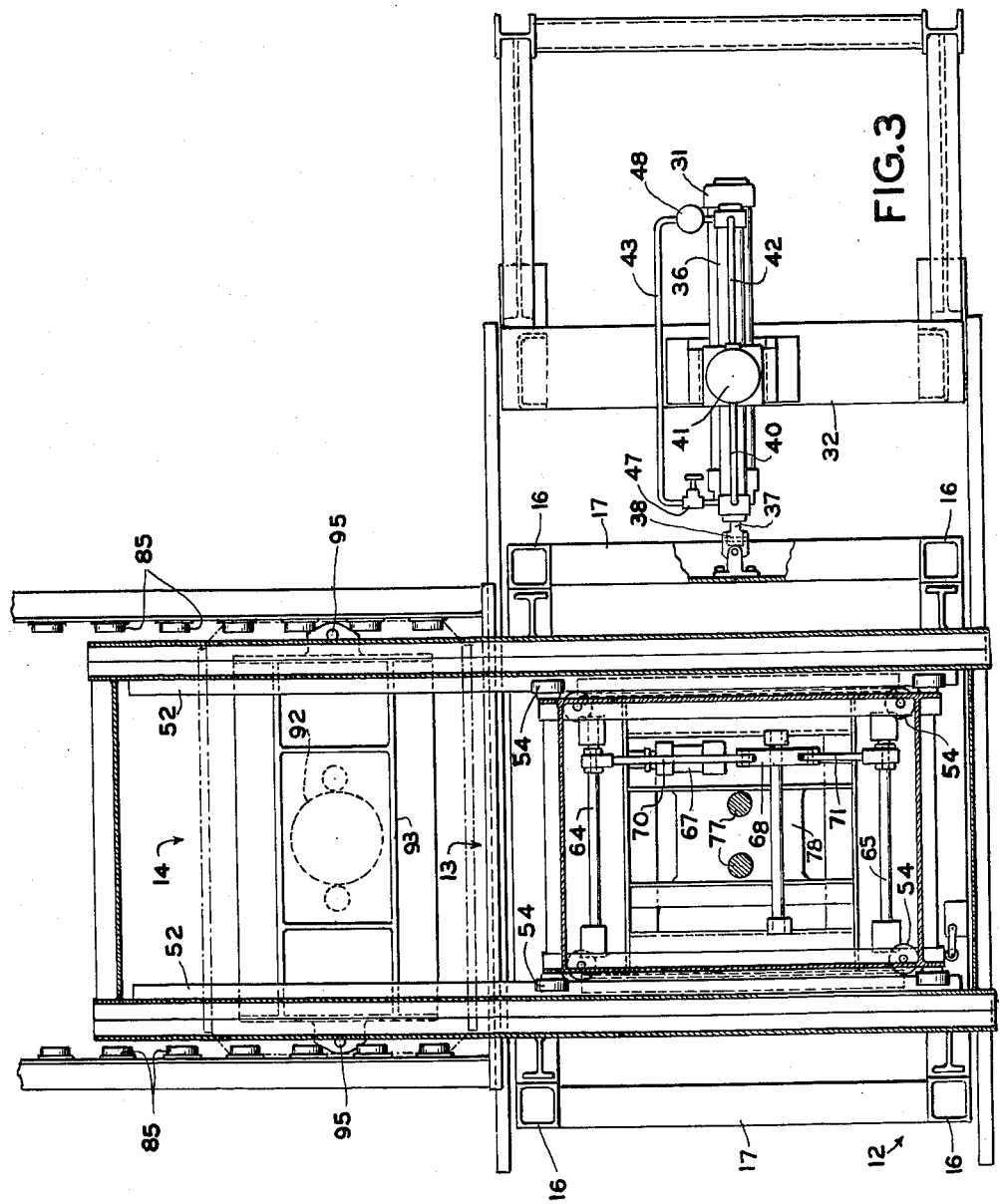
FIGURE 3 is a view taken generally along the line 3—3 of FIGURE 2.
Figure 4:
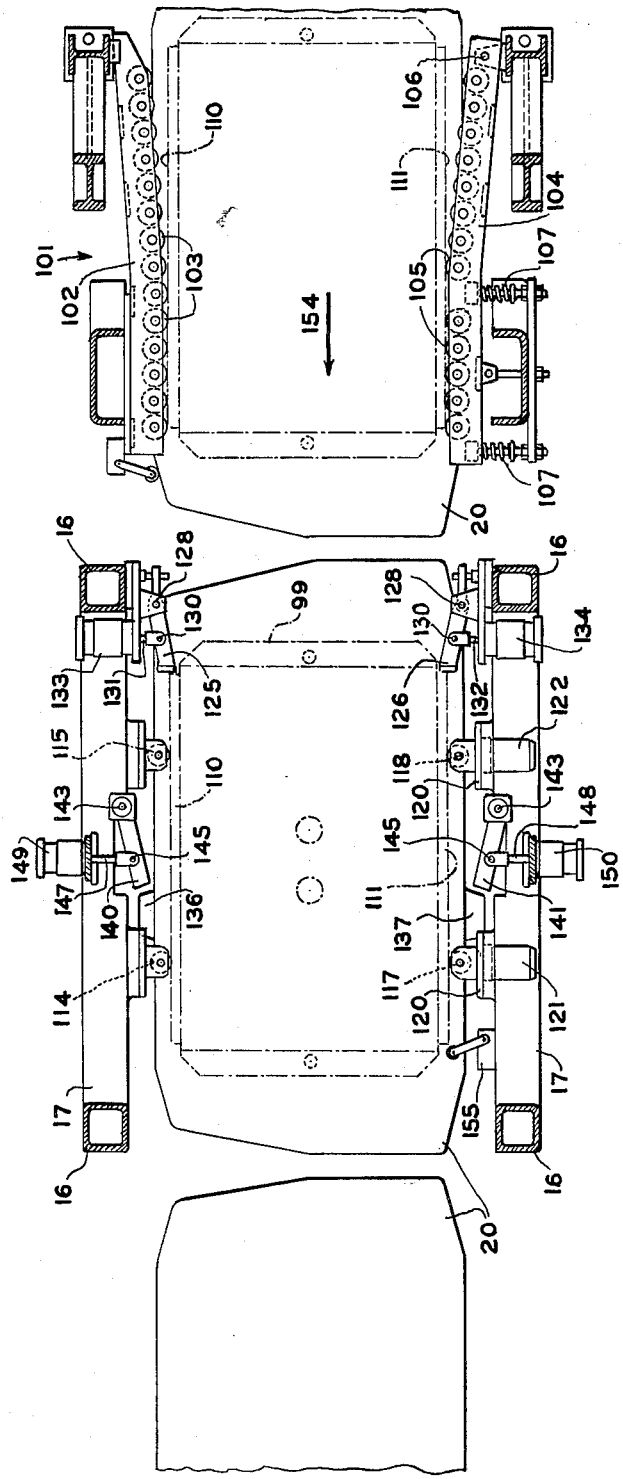
FIGURE 4 is a view taken generally along the line 4—4 of FIGURE 2.

Referring to FIGURES 1, 2 and 4, it will be seen that drag flasks 99 are transported by the above referred to mold conveyor on the pallets 20 between the side structures of the framework 12. Viewed in FIGURE 4, the drags approach the framework from the right and before reaching the framework a positioning device 101 tends to initially locate the drags upon the pallets. The positioning device includes a first member 102 fixedly secured in position and mounting a plurality of vertically disposed rollers 103. A second member 104 located opposite member 102 mounts rollers 105 in the same manner. Member 104 is adjustable in that at one end it is pivotally mounted as at 106 and the other end portion is biased by means of springs 107 toward the drag flask. The rollers on each of the members 102 and 104 converge toward each as they approach the framework 12 and these rollers are adapted to engage first and second alignment bars 110 and 111, respectively, on either side of a drag flask. Immediately after passing through the positioning device 101, the drag flask carried by a conveyor pallet moves between the side structures of the framework 12. A horizontal frame member 17 on one side of the framework fixedly mounts first and second vertically disposed rollers 114 and 115, respectively. The rollers 114 and 115 are adapted to engage the first alignment bar 110 on the drag flask. Mounted on a horizontal frame member 17 immediately opposite rollers 114 and 115 are mounted rollers 117 and 118. Each of these rollers is connected by way of a mounting bracket 120 to pistons which extend from pneumatic cylinders 121 and 122, respectively. The pneumatically urged rollers 117 and 118 may be referred to as lateral alignment means for laterally aligning the drag flask within the framework and relative to the cope transfer mechanism. The rollers 117 and 118 are located at a height to engage the second alignment bar 111 on the other side of the drag flask opposite bar 110. Mounted on either side of the framework and at the rear end thereof, or right as viewed in FIGURE 4, are first and second longitudinal alignment pawls 125 and 126, respectively. These pawls are pivotally connected to the framework, as at 128. Pivotally connected to the pawls, as at 130, are first and second piston rods 131 and 132, respectively, which extend from pneumatic cylinders 133 and 134, respectively. The pawls 125 and 126 upon actuation of the cylinders 133 and 134, respectively are adapted to move to the position shown in the full line drawing of FIGURE 4 where they can engage the drag flask and more specifically the alignment bars 110 and 111 on the drag flask. Extending from either side of the mold conveyor pallets are lugs 136 and 137, respectively. First and second over travel pawls 140 and 141, respectively, are pivotally connected as at 143, to the framework 12. Pivotally connected as at 145 are first and second pistons 147 and 148 which, respectively, extends from pneumatic cylinders 149 and 150. The over travel pawls 140 and 141, respectively, when moved to the full line position of FIGURE 4 by the pneumatic cylinders are in a position to engage the lugs or projections 136 and 137 on either side of the conveyor pallet. The purpose for this particular construction will be described hereinafter in the operation of the apparatus.

The instrumentation and the control system of the instant apparatus may vary from electrical to pneumatic or a combination of both and is not peculiarly necessary for the description or understanding of the present invention nor does it form a part thereof. A few of the control switches, helpful in understanding the present invention, have been illustrated in the accompanying drawings and will be referred to in part in the detailed description of the operation of the apparatus.

In the operation of the apparatus let it be assumed that the cope transfer mechanism 13 is in the position shown in FIGURES 1 and 2 securing a cope flask indicated by the dot-dash line 152 immediately above the drag mold conveyor and in a position to lower the cope flask 152 into place on a drag flask at a predetermined time. Referring to FIGURES 1 and 4 let it be assumed that a desired drag flask 99 has moved into the position shown beween the side frame members 16 of the framework 12. Upon reaching this position, the alignment bar 111 engages limit switch 155. It will be remembered that the drag mold conveyor is continuously moving in the direction indicated by the arrow 154 (FIGURE 4). When the switch 155 is thrown, the pneumatic cylinders 121 and 122 by way of rollers 117 and 118 urge the drag flask into engagement with the fixed rollers 114 and 115 to give a lateral alignment to the drag flask relative to the cope transfer mechanism 13 and the cope 152 which is carried thereby. At the same time, the alignment pawls 125 and 126 are moved to the full line position of FIGURE 4 and the over travel pawls 140 and 141 are also moved to the full line position. The throwing of switch 155 in addition to this causes actuation of means 30. Actuation of means 30 consists essentially of the following. Prior to switch 155 having been thrown, air is introduced into the right end of the piston which reciprocally travels in cylinder 31 thereby urging the same to the left. The piston in cylinder 31 is prevented from moving to the left because in order that it move, the piston in the hydraulic cylinder 36 must also move to the left. In order for the piston in cylinder 36 to move in this direction, hydraulic fluid must be forced out of the front end of the cylinder through conduit 43 to the back end of the cylinder. Since the valve 48 is in the closed position, this is not possible, and as a result, neither of the pistons in the cylinders 31 or 36 move. Throwing of switch 155 causes the opening of valve 48 permitting this above referred to movement which in turn through the connection of the pistons to the framework causes the framework to move from its first position (FIGURES 1 and 2) to its second position which would be the distance permitted by the throw of the pistons within cylinders 31 and 36. The throttle valve 47 regulates the opening through which fluid must travel therefore regulating the rate of travel of the framework 12. The extra volume of hydraulic fluid needed in the back end of cylinder 36 because of the absence of piston 37 is made up from the reservoir 41 through conduit 42. The speed of travel of the framework 12 is calculated to be just slightly greater than the speed of the conveyor pallets and hence the speed of the drag flasks which are carried thereon. This permits the alignment pawls 125 and 126 which are carried by the framework to engage the alignment bars 110 and 111 on the drag flask and urge the same forward at the same rate of speed. The over travel pawls 140 and 141 which are carried by the framework and which are adapted to engage the lugs 136 and 137 on the conveyor pallet insures that the drag flask cannot be pushed off of the conveyor pallets because upon engagement of the over travel pawls 140 and 141 with the lugs 136 and 137 the conveyor prevents the framework from traveling any faster than it does. This along with the fact that the alignment pawls 125 and 127 are urging the drag flask along with the framework, means that the drag flask is securely locked in place and travels with the framework 12. With the drag flask securely locked in with the travel of the framework and aligned with the cope transfer mechanism and the cope carried thereby, the cope can then be lowered into position on the drag flask. The actuation of cylinder 75 to lower the cope transfer mechanism may be accomplished by the throwing of switch 155 or it may be conditioned upon the framework 12 having traveled a short distance before the lowering of the cope transfer mechanism is effected. In either event, the lowering of the cope transfer mechanism is started at a predetermined signal and the cope mold is lowered over the drag mold with the final alignment of the cope and drag taking place on conventional flask pins and bushings.

When the cope transfer mechanism has reached its lowermost position of travel another limit switch is thrown which causes the actuation of pneumatic cylinder 67 which in turn causes fingers 59 and 60 to release the cope flask and which in turn causes air to be thrown on the underside of the piston 76 to urge the same upwardly within cylinder 75 to its uppermost vertical position. This also causes the pistons in cylinders 121, 122, 133, 134, 149 and 150 to be withdrawn and the closed mold then travels from the framework while means 30 is moving the framework back to its first position. In moving the framework back to the first position air is thrown on the left end (FIGURE 2) of cylinder 31 and valve 48 is moved to the closed position. The return movement of the hydraulic cylinder piston forces hydraulic fluid to the front of the hydraulic cylinder by way of conduits 40 and 42 and check valve 45. By this means faster return of framework 12 may be effected.

While this has been taking place another cope flask 90 has traveled down the gravity conveyor 83 onto the elevator 14. The cope transfer mechanism 13, after it has reached its uppermost vertical travel or sufficient vertical travel to clear the framework over the drag mold conveyor, the pneumatic cylinder 81 moves it to the dot-dash position 55 over the elevator 14. When it reaches this position it throws a limit switch 157 and this in conjunction with the throwing of limit switch 158 by the cope 90 and the throwing of limit switch 159 by the elevator 14 causes the elevator cylinder 92 to be actuated which moves the cope flasks 90 into the position indicated by the dotted lines 97. When it reaches this position, pneumatic cylinder 67 is actuated and fingers 59 and 60 grip the cope flask, elevator 14 lowers, and cylinder 81 is in turn actuated and moves the cope into position over the moving mold conveyor where it dwells until another drag mold moves into position as described hereinabove and the cycle is repeated. It will be readily appreciated that the controls for the apparatus vary from installation to installation and in most instances many more controls are utilized than have been described hereinabove. The inventive concept of the structure, operation, and result obtained by the present apparatus, however, is basically the same regardless of the control system used.

It will thus be seen that with the instant apparatus that cope flasks can be placed upon drag flasks which are being carried on a conveyor without the necessity of stopping or indexing each individual drag flask but rather while permitting the conveyor and drag flasks to continuously travel on the conveyor system. The resultant saving in time and effort will be obvious. The means which have been described hereinabove for driving the framework between this first and second position and which utilizes the combination of pneumatic and hydraulic means is capable of effecting a much smoother movement of the framework. The means which have been utilized for synchronizing the travel of the drag flask with the travel of the framework insures that the drag will be pre-positioned in an exact position relative to the cope thereby further insuring that the two will be in alignment when the cope is lowered into position on the drag. The means for laterally or longitudinally aligning the drag mold on the conveyor also insures matching of the cope and the drag.

It should be readily appreciated by those skilled in the art that the disclosures herein contained are susceptible of many uses and modifications, for example, instead of placing a cope flask on a drag flask, the apparatus can be utilized for transferring drag flasks on to the moving mold conveyor pallets. When the apparatus is utilized to place drag flasks on moving conveyor pallets, it is only necessary to utilize the over-travel pawls 140 and 141 or equivalent means since the lateral position of the conveyor and pallets relative to the framework is already predetermined by the track upon which the conveyor travels. The apparatus can also be utilized for putting or placing cores or other objects in the drag mold.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for positioning a cope flask on a drag flask including in combination first and second tracks positioned on either side of a drag mold conveyor, a framework mounted on said tracks and adapted for back and forth movement between first and second positions along the length of said drag mold conveyor, means for moving said framework on said back and forth movement between said first and second positions, a cope transfer mechanism mounted by said framework and adapted for movement between first and second positions relative to said framework and in a direction generally transverse to the movement of said framework and to said mold conveyor, means for moving said cope transfer mechanism between said first and second positions, said cope transfer mechanism including first and second pairs of spaced fingers movable between open and closed positions and adapted to secure a cope flask in said closed position, an elevator positioned adjacent said first track and positioned beneath said cope transfer mechanism in the first positions of said framework and said cope transfer mechanism respectively, a conveyor for transporting a cope flask to said elevator, means for raising and lowering said elevator, alignment means for positioning a cope flask in a predetermined position on said elevator, means for raising and lowering said cope transfer mechanism, lateral alignment means for aligning a drag flask within said framework, longitudinal alignment means carried by said framework and adapted to cooperate with a drag flask to cause said framework and drag flask to travel at the same rate during at least a portion of the travel of the framework from said first to said second position, over-travel protection means carried by said framework and adapted to cooperate with the drag mold conveyor to insure that said longitudinal alignment means does not push the drag flask from the drag mold conveyor.

2. Apparatus for positioning a cope on a drag including in combination track means positioned adjacent a drag mold conveyor, a framework mounted on said track means and adapted for back and forth movement between first and second positions along the drag mold conveyor, means for moving said framework between said first and second positions, a cope transfer mechanism mounted by said framework and adapted for movement between first and second positions relative to said framework, means for moving said cope transfer mechanism between said first and second positions, said cope transfer mechanism including gripping means movable between open and closed positions and adapted to secure a cope in said closed position, an elevator positioned adjacent the drag conveyor and positioned beneath said cope transfer mechanism in the first positions of said framework and said cope transfer mechanism respectively, a conveyor for transporting a cope to said elevator, means for raising and lowering said elevator, alignment means for positioning a cope in a predetermined position on said elevator, means for raising and lowering said cope transfer mechanism, lateral alignment means for aligning a drag within said framework, longitudinal alignment means carried by said framework and adapted to cooperate with a drag to cause said framework and drag to travel at the same rate during at least a portion of the travel of the framework from said first to said second position, over-travel protection means carried by said framework and adapted to cooperate with the drag mold conveyor to regulate the relative movement beween said fratmework and he drag mold conveyor.

3. Apparatus for positioning a cope flask on a drag flask including in combination track means positioned adjacent a drag mold conveyor, a framework mounted on said track means and adapted for back and forth movement between first and second positions along the drag mold conveyor, means for moving said framework between said first and second positions, a cope transfer mechanism mounted by said framework and adapted for movement between first and second positions relative to said framework and in a direction generally transverse to the movement of said framework, means for moving said cope transfer mechanism between said first and second positions, said cope transfer mechanism including fingers movable between open and closed positions and adapted to secure a cope flask in said closed position, an elevator positioned adjacent the drag conveyor and positioned beneath said cope transfer mechanism in the first positions of said framework and said cope transfer mechanism respectively, means for raising and lowering said elevator, alignment means for positioning a cope flask in a predetermined position on said elevator, means for raising and lowering said cope transfer mechanism, alignment means for aligning a drag flask within said framework, and over-travel protection means carried by said framework and adapted to cooperate with the drag mold conveyor to regulate the relative movement between said framework and the drag mold conveyor.

4. Apparatus for positioning a cope on a drag including in combination track means positioned adjacent a drag mold conveyor, a framework mounted on said track means and adapted for movement between first and second positions along the drag mold conveyor, means for moving said framework between said first and second positions, a cope transfer mechanism mounted by said framework and adapted for movement between first and second positions relative to said framework, means for moving said cope transfer mechanism between its said first and second positions, said cope transfer mechanism including gripping means movable between open and closed positions and adapted to secure acope in said closed position, a conveyor for transporting a cope to a position adjacent the drag conveyor which position is beneath said cope transfer mechanism in the first positions of said framework and said cope transfer mechanism respectively, means for raising and lowering said cope transfer mechanism, lateral alignment means for aligning a drag within said framework, longitudinal alignment means carried by said framework and adapted to cooperate with a drag to cause said framework and drag to travel at the same rate during at least a portion of the travel of the framework from said first to said second position, over-travel protection means carried by said framework and adapted to cooperate with the drag mold conveyor to regulate the relative movement between said framework and the drag mold conveyor.

5. Apparatus for positioning a cope flask on a drag flask including in combination first and second tracks positioned on either side of a drag mold conveyor, a framework mounted on said tracks and adapted for back and forth movement between first and second positions along the length of said drag mold conveyor, means for moving said framework on said back and forth movement between said first and second positions, a cope transfer mechanism mounted by said framework and adapted for movement between first and second positions relative to said framework and in a direction generally transverse to the movement of said framework and to said mold conveyor, means for moving said cope transfer mechanism between its said first and second positions, said cope transfer mechanism including first and second pairs of spaced fingers movable between open and closed positions and adapted to secure a cope flask in said closed position, a receiving station positioned adjacent said first track and positioned beneath said cope transfer mechanism in the first positions of said framework and said cope transfer mechanism respectively, a conveyor for transporting a cope flask to said receiving station, alignment means for positioning a cope flask in a predetermined position on said receiving station, means for lowering and raising said cope transfer mechanism, lateral alignment means for aligning a drag flask within said framework, longitudinal alignment means carried by said framework and adapted to cooperate with a drag flask to cause said framework and drag flask to travel at the same rate during at least a portion of the travel of the framework from said first to said second position, and over-travel protection means carried by said framework and adapted to cooperate with the drag mold conveyor to insure that said longitudinal alignment means does not push the drag flask from the drag mold conveyor.

6. Apparatus for positioning a first member relative to a second member which is being transported on a second member conveyor, including in combination track means positioned adjacent said member conveyor, a framework mounted on said track means and adapted for back and forth movement between first and second positions along said second member conveyor, means for moving said framework between said first and second positions, a first member transfer mechanism mounted by said framework and adapted for movement between first and second positions relative to said framework, means for moving said first member transfer mechanism between its said first and second positions, said first member transfer mechanism including gripping means movable between open and closed positions and adapted to secure a first member in said closed position, a receiving station positioned adjacent said second member conveyor and positioned beneath said first member transfer mechanism in the first positions of said framework and said first member transfer mechanism respectively, a conveyor for transporting a first member to said receiving station, alignment means for positioning a first member in a predetermined position on said receiving station, means for lowering aid raising said first member transfer mechanism, lateral alignment means for aligning a second member within said framework, longitudinal alignment means carried by said framework and adapted to cooperate with a second member to cause said framework and second member to travel at the same rate during at least a portion of the travel of the framework from said first to said second position, over-travel protection means carried by said framework and adapted to cooperate with said second member conveyor to regulate the relative movement between said framework and said second member conveyor.

7. Apparatus for moving a first member which is supported by a second member which is being transported on a second member conveyor, including in combination track means positioned adjacent said second member conveyor, a framework mounted on said track means and adapted for back and forth movement between first and second positions along said second member conveyor, means for moving said framework between said first and second positions, a first member transfer mechanism mounted by said framework and adapted for movement between first and second positions relative to said framework, means for moving said first member transfer mechanism between its said first and second positions, said first member transfer mechanism including gripping means movable between open and closed positions and adapted to secure a first member in said closed position, a receiving station positioned adjacent said second member conveyor and positioned beneath said first member transfer mechanism in the first positions of said framework and said first member transfer mechanism respectively, a conveyor for transporting a first member relative to said receiving station, means for lowering and raising said first member transfer mechanism, lateral alignment means for aligning a second member within said framework, longitudinal alignment means carried by said framework and adapted to cooperate with a second member to cause said framework and second member to travel at the same rate during at least a portion of the travel of the framework from said first to said second position, over-travel protection means carried by said framework and adapted to cooperate with the second member conveyor to regulate the relative movement between said framework and the second member conveyor.

8. Apparatus for moving a first member relative to a second member which is being transported on a conveyor, said apparatus including a framework mounted for movement between first and second positions along a portion of the length of the conveyor, first means for moving said framework between said first and second positions, a carrying mechanism mounted by said framework for carrying the first member relative to its position on the second member, second means for raising and lowering said carrying mechanism, lateral alignment means for aligning a second member within said framework, longitudinal alignment means carried by said framework and adapted to cooperate with a second member to longitudinally align the same, means for actuating said first and second means upon arrival of said second member into position relative to said framework thereby moving said framework and second member along said conveyor at the same rate during at least a portion of the travel of the framework and moving the first member relative to said second member, over-travel protection means carried by said framework and adapted to cooperate with the conveyor to regulate the relative movement between said framework and said conveyor.

9. Apparatus for positioning a first member on a second member which is being transported on a conveyor, said apparatus including a framework mounted for movement between first and second positions along a portion of the length of said conveyor, first means for moving said framework between said first and second positions, a carrying mechanism mounted by said framework for carrying the first member and lowering the same into position on the second member, second means for raising and lowering said carrying mechanism, lateral alignment means for aligning a second member within said framework, longitudinal means carried by said framework and adapted to cooperate with a second member for longitudinally aligning the same, means for actuating said first and second means upon arrival of said second member into position relative to said framework thereby moving said framework and second member along said conveyor at the same rate during at least a portion of the travel of the framework and lowering the first member onto said second member.

10. Apparatus for positioning a first member on a second member which is being transported on a conveyor, said apparatus including a framework mounted for movement between first and second positions along a portion of the length of said conveyor, first means for moving said framework between said first and second positions, a carrying mechanism mounted by said framework for carrying the first member and lowering the same into position on the second member, second means for raising and lowering said carrying mechanism, lateral alignment means for aligning a second member within said framework, longitudinal means carried by said framework and adapted to cooperate with a second member for longitudinally aligning the same, means for actuating said first and second means upon arrival of said second member into position relative to said framework thereby moving said framework and second member along said conveyor at the same rate during at least a portion of the travel of the framework and lowering the first member onto said second member, and over-travel protection means carried by said framework and adapted to cooperate with the conveyor to regulate the relative movement between said framework and the conveyor.

11. Apparatus for positioning a first foundry member on a second foundry member including in combination track means positioned adjacent a second foundry member conveyor, a framework mounted on said track means and adapted for back and forth movement between first and second positions along the length of said second foundry member conveyor, means for moving said framework on said back and forth movement between said first and second positions, a first foundry member transfer mechanism mounted by said framework and adapted for movement between first and second positions relative to said framework and in a direction generally transverse to the movement of said framework and to said second foundry member conveyor, means for moving said first foundry member transfer mechanism between its said first and second positions, said first foundry member transfer mechanism including gripping means movable between open and closed positions and adapted to secure a first foundry member in said closed position, receiving means positioned adjacent said track means and positioned beneath said first foundry member transfer mechanism in the first positions of said framework and said first foundry member transfer mechanism respectively, feed conveyor means for transporting a first foundry member to said receiving means, means for lowering and raising said first foundry member transfer mechanism, lateral alignment means for aligning a second foundry member within said framework including a member carried by said framework and engageable with a second foundry member on said second foundry member conveyor to laterally align same within said framework, longitudinal alignment means including a member carried by said framework and movable to engage a second foundry member to cause said framework and the second foundry member to travel at the same speed during at least a portion of the travel of the framework from its said first to its said second position, and over travel protection means including a member carried by said framework and movable to engage said second foundry member conveyor to insure that said longitudinal alignment means does not push the second foundry member from said second foundry member conveyor.

12. Apparatus for placing a mold part on a continuously moving conveyor including in combination a framework mounted over said conveyor and adapted for back and forth movement between first and second positions, said conveyor adapted to travel at substantially a constant elevation while a part is being placed thereon, means actuated upon movement of said conveyor into position relative to said framework for moving said framework from said first position toward said second position at a faster rate of speed than said conveyor is traveling whereby said framework overtakes said conveyor, means acting between said framework and said conveyor to prevent said framework from traveling faster than said conveyor once same has been overtaken whereby said framework and conveyor travel to said second position at the same rate of speed, a carrying mechanism carried by said framework and adapted to travel between first and second vertical positions to place a part on said conveyor when said conveyor and framework are traveling at the same rate of speed.

13. Apparatus for moving a mold part relative to a portion of a continuously moving conveyor which travels at a given rate of speed, including in combination a framework adapted to be mounted adjacent the conveyor and adapted for back and forth movement between first and second positions, means actuated upon movement of the conveyor into position relative to said framework for moving said framework from said first position toward said second position at a faster rate of speed than said given rate of speed whereby said framework is adapted to overtake the portion of the conveyor, means acting between said framework and the portion of the conveyor to prevent said framework from traveling faster than said given rate of speed once the portion of the conveyor has been overtaken whereby said framework and the portion of the conveyor travel to said second position at the same rate of speed, a carrying mechanism carried by said framework and adapted to travel between first and second vertical positions to move a part relative to the conveyor when the conveyor and framework are traveling at the same rate of speed.

References Cited in the file of this patent

UNITED STATES PATENTS

| | | |
|---|---|---|
| 1,651,206 | Hitchcock | Nov. 29, 1927 |
| 2,575,103 | Gavin | Nov. 13, 1951 |
| 2,611,493 | Nordquist | Sept. 23, 1952 |
| 2,615,588 | Gedris | Oct. 28, 1952 |
| 2,754,555 | Young | July 17, 1956 |
| 2,847,735 | Butler | Aug. 19, 1958 |
| 2,948,932 | Buhrer | Aug. 16, 1960 |